US012618803B2

(12) United States Patent
MacKay et al.

(10) Patent No.: US 12,618,803 B2
(45) Date of Patent: May 5, 2026

(54) SYSTEM AND METHOD FOR AUTOMATED ACQUISITION AND ANALYSIS OF ELECTROMAGNETIC TESTING DATA

(71) Applicant: Eddyfi Canada Inc., Québec (CA)

(72) Inventors: Philippe MacKay, Quebec (CA);
Vincent Gaudreault, Levis (CA);
Florian Hardy, Lac-Sergent (CA);
Marco Michele Sisto, Quebec (CA)

(73) Assignee: National Bank of Canada, Montreal (CA)

( * ) Notice: Subject to any disclaimer, the term of this patent is extended or adjusted under 35 U.S.C. 154(b) by 776 days.

(21) Appl. No.: 17/975,314

(22) Filed: Oct. 27, 2022

(65) Prior Publication Data

US 2023/0138975 A1    May 4, 2023
US 2023/0314373 A9    Oct. 5, 2023

Related U.S. Application Data

(60) Provisional application No. 63/263,269, filed on Oct. 29, 2021.

(51) Int. Cl.
*G01N 27/82*        (2006.01)
*G01N 27/87*        (2006.01)
(Continued)

(52) U.S. Cl.
CPC ............. *G01N 27/82* (2013.01); *G01N 27/87* (2013.01); *G01N 27/9046* (2013.01); *G06N 5/022* (2013.01); *G01N 27/9086* (2013.01)

(58) Field of Classification Search
CPC ........ G01N 27/82; G01N 27/87; G01N 27/90; G01N 27/9073; G01N 27/9086; G01N 27/9046; G06N 3/02; G06N 5/022
See application file for complete search history.

(56) References Cited

U.S. PATENT DOCUMENTS 4,763,274 A    8/1988  Junker et al.
5,339,256 A    8/1994  Levy et al.
(Continued)

OTHER PUBLICATIONS

Nadinic, Barislav. "EddyOne Automated Analysis of PWR/WWER Steam Generator Tubes Eddy Current Data"—5th International Conference on Nuclear Option in Countries with Small and Medium Electricity Grids, May 2004. (Year: 2004).*

(Continued)

*Primary Examiner* — Benjamin R Schmitt
(74) *Attorney, Agent, or Firm* — Volpe Koenig

(57) ABSTRACT

A method for identifying indications in an object via non-destructive testing using inspection equipment comprising a probe is described. The method includes: recording test data corresponding to a signal measurement acquired by the probe; processing the test data using a first analysis machine learning algorithm trained to output a list of detected landmarks; processing the list of detected landmarks to identify regions in the object based on the landmarks; processing the test data and the identified regions using a second analysis machine learning algorithm to output a list of detected indications; processing the list of indications to automatically classify each indication according to one of a plurality of predefined indication types; and outputting the classified indications in a report specifying positions of the classified indications in the object. A corresponding system and non-transitory computer-readable medium are also described.

20 Claims, 13 Drawing Sheets

(51) Int. Cl.
    G01N 27/90         (2021.01)
    G06N 5/022        (2023.01)

(56)           References Cited

U.S. PATENT DOCUMENTS

| | | | |
|---|---|---|---|
| 6,115,674 | A | 9/2000 | Brudnoy et al. |
| 6,424,151 | B2 | 7/2002 | Kawata et al. |
| 6,519,535 | B1 | 2/2003 | Petri et al. |
| 8,386,404 | B2 | 2/2013 | Strizzi et al. |
| 11,078,631 | B2 | 8/2021 | Gilbert |
| 2007/0222436 | A1* | 9/2007 | Gao ........................ G01N 27/82 |
| | | | 324/220 |
| 2007/0239407 | A1* | 10/2007 | Goldfine ................ G01N 27/82 |
| | | | 703/2 |
| 2016/0018362 | A1* | 1/2016 | Le .......................... B24B 49/105 |
| | | | 702/34 |
| 2017/0219528 | A1* | 8/2017 | Horn .................. G01N 27/9046 |

OTHER PUBLICATIONS

Xiang et al. "Automated analysis of rotating probe multi-frequency eddy current data from steam generator tubes"—International Journal of Applied Electromagnetics and Mechanics, 2000. (Year: 2000).*

Smid, Radislav et al. Automated classification of eddy current signatures during manual inspection. Ndt & E International, 2005, vol. 38, No. 6, p. 462-470.

Udpa, L. et al. Automated analysis of eddy current signals in steam generator tube inspection. Proceedings of the 16th WCNDT, 2004.

Zhu, Peipei et al. A novel machine learning model for eddy current testing with uncertainty. Ndt & E International, 2019, vol. 101, p. 104-112.

* cited by examiner

100

107

101

Tube-side
Cold fluid out shell-side
fluid in

105 shell-side
fluid out

Tube-side
Hot fluid in

100

101

103

107

208

900

SYSTEM AND METHOD FOR AUTOMATED ACQUISITION AND ANALYSIS OF ELECTROMAGNETIC TESTING DATA

CROSS REFERENCE TO RELATED APPLICATION

This application claims the benefit of and priority to U.S. Provisional Patent Application No. 63/263,269, filed Oct. 29, 2021, and entitled SYSTEM AND METHOD FOR AUTOMATED ACQUISITION AND ANALYSIS OF ELECTROMAGNETIC TESTING DATA, the entirety of which is incorporated herein by reference.

TECHNICAL FIELD

The technical field generally relates to non-destructive testing, and more specifically to systems and methods for testing ferromagnetic and non-ferromagnetic tubes, which are often inspected by inserting probes in the tube.

BACKGROUND

Non-destructive testing (NDT) is the process of inspecting objects, without inducing permanent modification of the object, with the aim of identifying defects, imperfections, or other meaningful physical features of the object (referred to as "indications").

Different NDT techniques exist that employ one or more electromagnetic or acoustic sensors in array configurations, including but not limited to: Eddy Current Testing (ECT), Eddy Current Arrays (ECA), ECT rotating probes, Remote Field Testing (RFT), Remote Field Arrays (RFA), Internal Rotary Inspection Systems (IRIS), Partially Saturated Eddy Current Testing (PSECT), Fully Saturated Eddy Current Testing (FSECT), Magnetic Flux Leakage (MFL), Near Field Testing (NFT), Near Field Arrays (NFA), and Pulsed Eddy Current (PEC).

Regardless the NDT technique, the inspection is performed by capturing electromagnetic/acoustic "raw" data with probes and instruments. The data is then normalized and analyzed by a human analyst to identify all interesting indications. Both the acquisition and the analysis processes can be long and error prone. There is therefore a need in the industry for solutions to assist probe operators in the acquisition of good quality data and assist analysts in the detection and classification of indications.

SUMMARY

According to an aspect, a method is provided for identifying landmarks in an object from signals captured by a probe during non-destructive testing of the object. The method includes: processing the signals using a machine learning algorithm to identify a plurality of predetermined landmark types, the algorithm being configured to output a sequence of connected regions in the test data corresponding to sequences of the plurality of data points likely corresponding to a same type of the plurality of predetermined landmark types; generating a sequence of identified landmarks by concatenating each of the connected regions; comparing the sequence of identified landmarks to a model defining an expected sequence of landmarks in the object, and identifying a subset of identified landmarks in the sequence of identified landmarks that fits best with the model; and outputting a landmark sequence corresponding to the subset of identified landmarks.

According to an aspect, a method for identifying indications in an object via non-destructive testing is provided. The method includes: recording test data from a probe operated to scan the object, the test data comprising a plurality of data points, each data point corresponding to a signal measurement acquired by the probe; processing the test data using a first machine learning algorithm trained to identify a plurality of predetermined landmark types, the first algorithm being configured to output a sequence of identified landmarks and to identify regions in the object based on the landmarks; processing the test data and the identified object regions using a second machine learning algorithm trained to segment indications in the identified regions of the object from the test data, the second neural network being configured to output a list of detected indications; for each indication in the list of detected indications, applying a predefined decision tree to either discard the indication or classify the indication according to one of a plurality of predefined indication types; and outputting the classified indications in a report specifying positions of the classified indications relative to at least some of the identified landmarks.

According to an aspect, a method is provided for identifying landmarks in an object from signals captured by a probe during non-destructive testing of the object. The method includes: processing the signals using a neural network trained to identify a plurality of predetermined landmark types, the algorithm being configured to output a sequence of connected regions in the test data corresponding to sequences of the plurality of data points likely corresponding to a same type of the plurality of predetermined landmark types; generating a sequence of identified landmarks by concatenating each of the connected regions; comparing the sequence of identified landmarks to a model defining an expected sequence of landmarks in the object, and identifying a subset of identified landmarks in the sequence of identified landmarks that fits best with the model; and outputting a landmark sequence corresponding to the subset of identified landmarks.

According to an aspect, a method for identifying indications in an object via non-destructive testing is provided. The method includes: recording test data from a probe operated to scan the object, the test data comprising a plurality of data points, each data point corresponding to a signal measurement acquired by the probe; processing the test data using a first machine learning algorithm trained to identify a plurality of predetermined landmark types, the first algorithm being configured to output a sequence of identified landmarks and to identify regions in the object based on the landmarks; processing the test data and the identified object regions using a second machine learning algorithm trained to segment indications in the identified regions of the object from the test data, the second neural network being configured to output a list of detected indications; for each indication in the list of detected indications, applying a predefined decision tree to either discard the indication or classify the indication according to one of a plurality of predefined indication types; and outputting the classified indications in a report specifying positions of the classified indications relative to at least some of the identified landmarks.

According to an aspect, a method for identifying indications in an object via non-destructive testing using inspection equipment comprising a probe is provided. The method includes: recording test data from the probe while the probe is operated to scan the object, the test data comprising a plurality of data points, each data point corresponding to a signal measurement acquired by the probe; processing the test data using a first analysis machine learning algorithm trained to detect landmarks in the test data and output a list of detected landmarks; processing the list of detected landmarks to identify regions in the object based on the landmarks; processing the test data and the identified regions using a second analysis machine learning algorithm trained to detect indications in the test data and output a list of detected indications; processing the list of indications to automatically classify each indication according to one of a plurality of predefined indication types; and outputting the classified indications in a report specifying positions of the classified indications in the object.

According to an aspect, a system for identifying indications in an object via non-destructive testing is provided. The system includes: a probe; a recording device in operative communication with the probe, the recording device comprising a storage module configured to record and store test data from the probe while the probe is operated to scan the object, the test data comprising a plurality of data points, each data point corresponding to a signal measurement acquired by the probe; and an analysis device configured to access the test data stored by the recording device, the analysis device comprising a test data analysis module configured to: process the test data using a first analysis machine learning algorithm trained to detect landmarks in the test data and output a list of detected landmarks; process the list of detected landmarks to identify regions in the object based on the landmarks; process the test data and the identified regions using a second analysis machine learning algorithm trained to detect indications in the test data and output a list of detected indications; process the list of indications to automatically classify each indication according to one of a plurality of predefined indication types; and output the classified indications in a report specifying positions of the classified indications in the object.

According to an aspect, a non-transitory computer-readable medium is provided. The computer-readable medium has instructions stored thereon to identify indications in an object via non-destructive testing using inspection equipment comprising a probe. The instructions, when executed by one or more processors, cause the one or more processors to: record test data from the probe while the probe is operated to scan the object, the test data comprising a plurality of data points, each data point corresponding to a signal measurement acquired by the probe; process the test data using a first analysis machine learning algorithm trained to detect landmarks in the test data and output a list of detected landmarks; process the list of detected landmarks to identify regions in the object based on the landmarks; process the test data and the identified regions using a second analysis machine learning algorithm trained to detect indications in the test data and output a list of detected indications; process the list of indications to automatically classify each indication according to one of a plurality of predefined indication types; and output the classified indications in a report specifying positions of the classified indications in the object.

DETAILED DESCRIPTION

In the following description, systems and methods for assisting in the acquisition and analysis of test data from non-destructive testing of objects will be presented. Embodiments of the systems and methods will be described in connection with the inspection of the interior of metallic tubes in a heat exchanger, and in particular a heat exchanger used during the processing of oil and gas. It should be appreciated, however, that the teachings of the present disclosure can apply to the inspection of the exterior of metallic tubes and/or during the inspection of other types of metallic or non-metallic objects. Moreover, the teachings of the present disclosure can apply to acquiring and analyzing different types of signals and are not limited to electromagnetic signals.

Figures 1A, 1B:
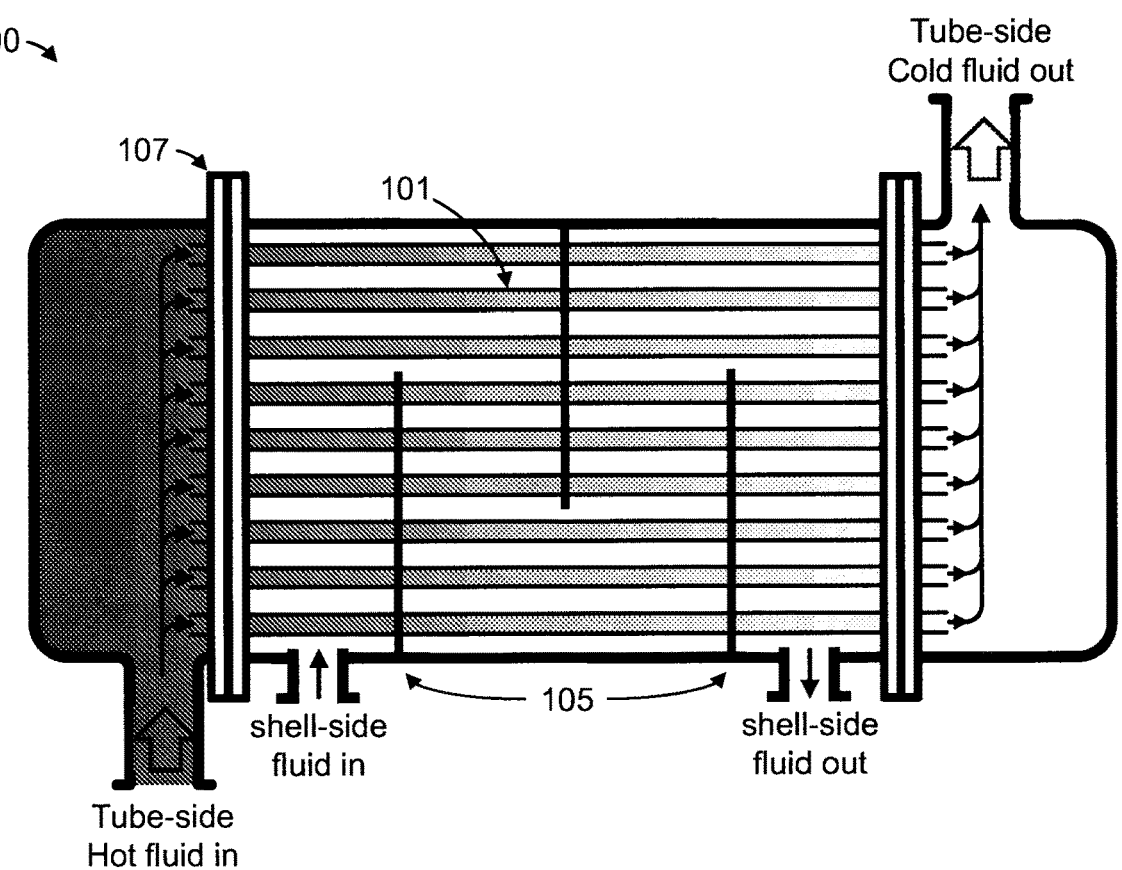
FIGS. 1A and 1B illustrate a heat exchanger having tubes that can be inspected using NDT.

With reference to FIGS. 1A and 1B, an exemplary object 100 (also referred to as an asset) that can be inspected using NDT is shown. In the illustrated example, the object 100 corresponds to a heat exchanger used during the processing of oil and gas. The heat exchanger comprises a plurality of metallic tubes 101. The interior of the metallic tubes 101 can be inspected to identify indications, such as defects including corrosion or pitting, among others. During inspection, electromagnetic probes 103 are inserted into the tubes 101, and electromagnetic signals measured by the probes 103 can be recorded as raw test data as the probes 103 are moved along the length of the tube.

The raw test data can be processed and analyzed in order to identify, characterize and locate indications in the metallic tubes 101. A report can subsequently be generated and delivered to the asset owner. The report can specify the health status of the heat exchanger as well as any indications revealed by the inspection. Such indications can include, for example: landmarks (i.e. locations of predefined structural elements within the heat exchanger, such as baffles 105 and tube sheets 107); defects with loss of metal (ex: corrosion, pitting, etc.); defects without loss of metal (ex: dents, bulges, etc.); presence of magnetic deposit in exchanger tubes; etc. In the report, the location of defects identified in the tubes 101 can be indicated. In some embodiments, the locations of defects can be indicated according to their position relative to landmarks.

Figure 2:
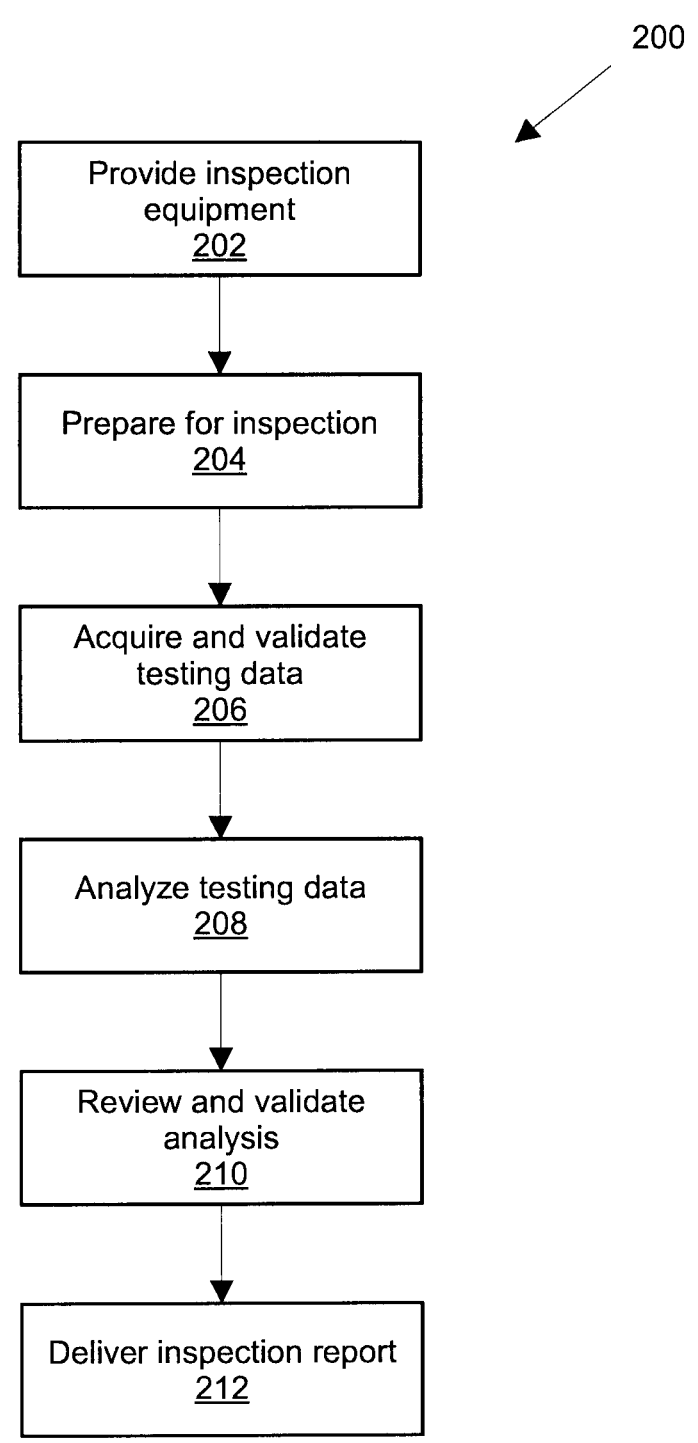
FIG. 2 is a flowchart illustrating a method for acquiring and analyzing test data during NDT, according to an embodiment.

With reference now to FIG. 2, an exemplary method 200 for acquiring and analyzing test data during non-destructive testing of a heat exchanger is shown according to an embodiment. The method 200 can include a first step 202 of providing inspection equipment at an inspection site. As can be appreciated, the inspection equipment that is provided can vary depending on the nature of the object that is to be inspected and the type of inspection to be carried out. For example, an inspection contract can be agreed upon with a client and the appropriate inspection equipment can be selected. Inspection staff and equipment can then be scheduled before eventually travelling and shipping the equipment to the site where the inspection is to be carried out, and where the equipment can be prepared to conduct the inspection.

Figure 3:
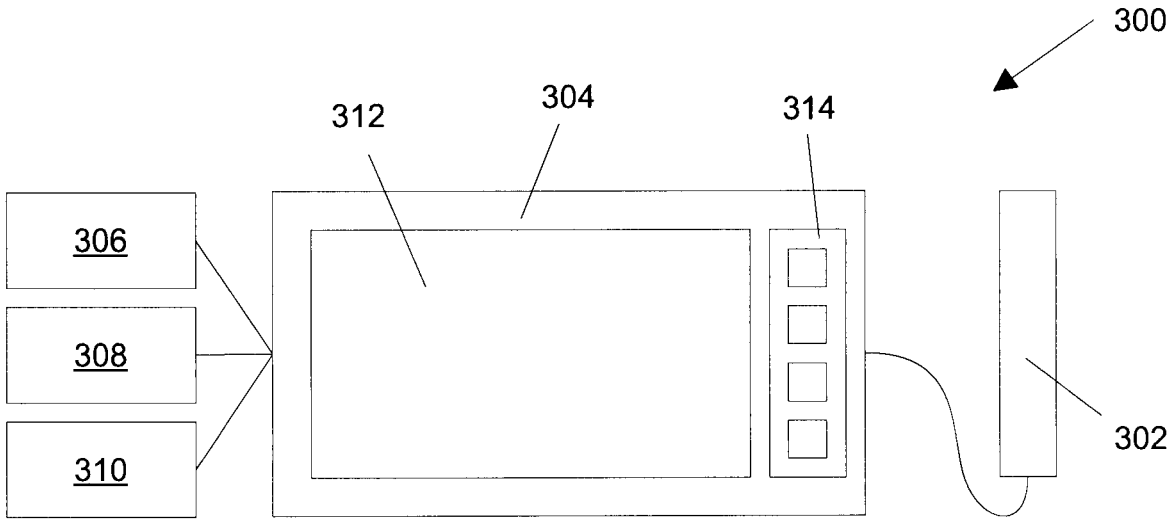
FIG. 3 is a schematic illustrating inspection equipment that can be used to conduct NDT, according to an embodiment.

By way of example, and with reference to FIG. 3, inspection equipment 300 can include at least an inspection instrument 302 in operative communication with a recording device 304. In the present embodiment, the inspection instrument 302 comprises an electromagnetic probe, and the recording device 304 comprises a portable computing system coupled to the probe. The portable computing system can comprise various software and/or hardware modules to assist in the acquisition of test data and the analysis thereof. For example, in the present embodiment, the computing device comprises a processor and memory storing computer-executable instructions which, when executed by the processor, cause the processor to implement a calibration module 306 for calibrating the inspection equipment 300, a storage module 308 for storing signals measured via recording device 304, and a validation module 310 for validating recorded data. The computing device further includes a user interface module, for example comprising a touchscreen display 312 and buttons 314, allowing a user to interact with the computing device and control the inspection equipment 300 as needed. It is appreciated, however, that other hardware and/or software modules can be provided.

Returning to FIG. 2, subsequent steps in the method 200 can comprise preparing for inspection 204, and operating the inspection equipment 300 to acquire and validate test data 206. The acquired testing data can then be analyzed 208 in order to identify, characterize and locate indications in the metallic tubes of the heat exchanger. In some embodiments, the analysis can be subject to review and validation 210 before a report is delivered to the client 212.

Figure 12:
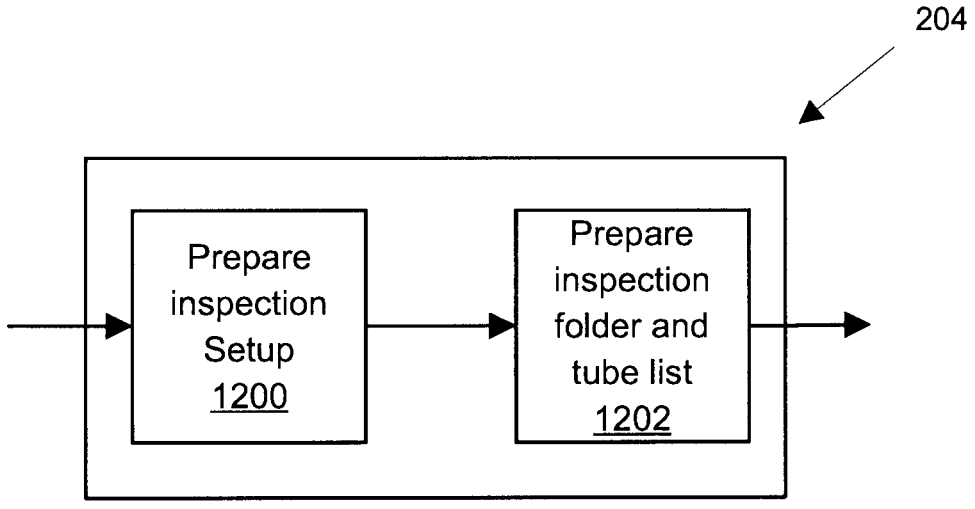
FIG. 12 is a flowchart illustrating subprocesses for preparing for inspection in the method of FIG. 2.

With reference to FIG. 12, the step of preparing for inspection 204 is shown in more detail, according to an exemplary embodiment. A first subprocess 1200 can comprise preparing inspection setup. This can include guiding a user (ex: a probe operator) in the setup definition by requesting user input on some basic parameters and suggesting the appropriate instrument settings and setup. In an embodiment, this can be done via rule-based algorithms. By way of example, a configuration wizard can be provided for allowing selection of parameters such as inspection frequencies from tube material and thickness, using known-in-the-art rules and algorithms.

A second subprocess 1202 can comprise assisting the preparation of the inspection folder and tube list by creating a tube list automatically. In an embodiment, this can be accomplished by analyzing a photo of the exchanger tube sheet, with visual recognition of each tube. By way of example, machine learning or deep learning methods can be applied for image analysis and tube recognition. The output of the analysis can comprise a tube list with tube rows and columns numbered to represent the exchanger and tube layout.

Figure 4:
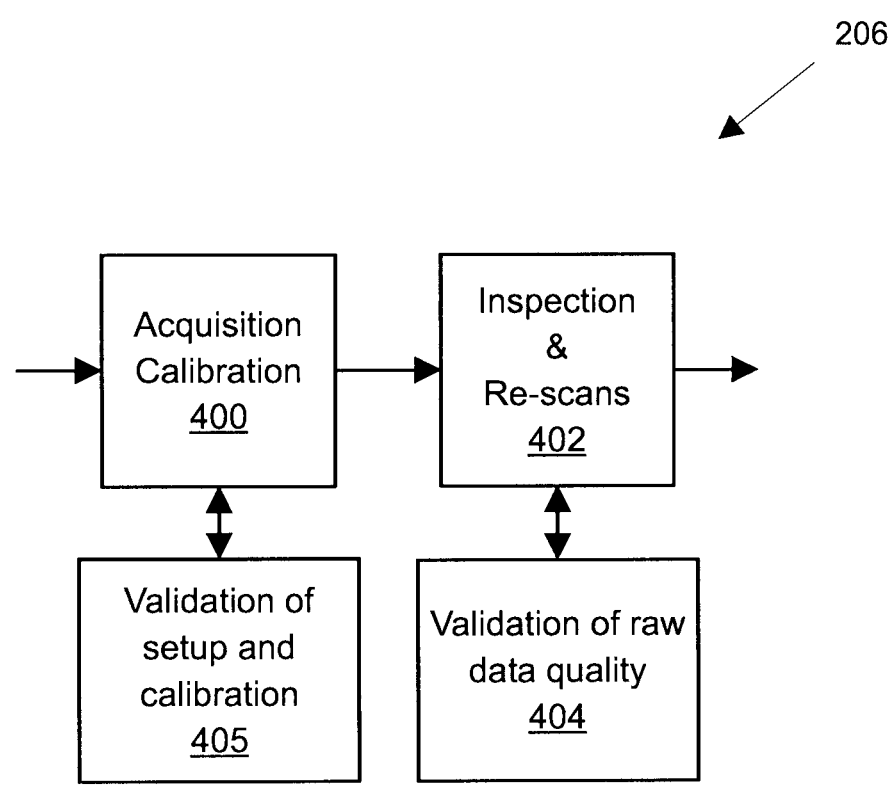
FIG. 4 is a flowchart illustrating subprocesses for acquiring and validating test data in the method of FIG. 2.

With reference to FIG. 4, the step of data acquisition and validation 206 is shown in more detail. As can be appreciated, prior to acquiring testing data, one or more parameters of the inspection equipment may need to be adjusted, since such parameters will impact the quality and information content of the raw data captured by the inspection instrument 302 and recorded by the recording device 304. Accordingly, a first subprocess of the data acquisition and validation 206 step can comprise calibrating the inspection equipment 400. This subprocess can, for example, be carried out via calibration module 306 of the inspection equipment 300.

The inspection equipment 300, and specifically the recording device 304, can be calibrated by using the inspection instrument 302 (i.e. the electromagnetic probe) to record measurements from a reference object, such as a reference tube having known defects or other indications. More specifically, in the present embodiment, calibration data can be recorded from electromagnetic signals measured by the probe as the probe is moved along the interior of the reference tube. A calibration algorithm can then be applied to the captured calibration data to extract calibration parameters therefrom. In order for such algorithms to be applicable, specific signatures in the calibration data need to be identified, such as signatures corresponding to known indications in the reference tube (for example, a signature corresponding to a hole or other reference defect in the reference tube).

Figure 5:
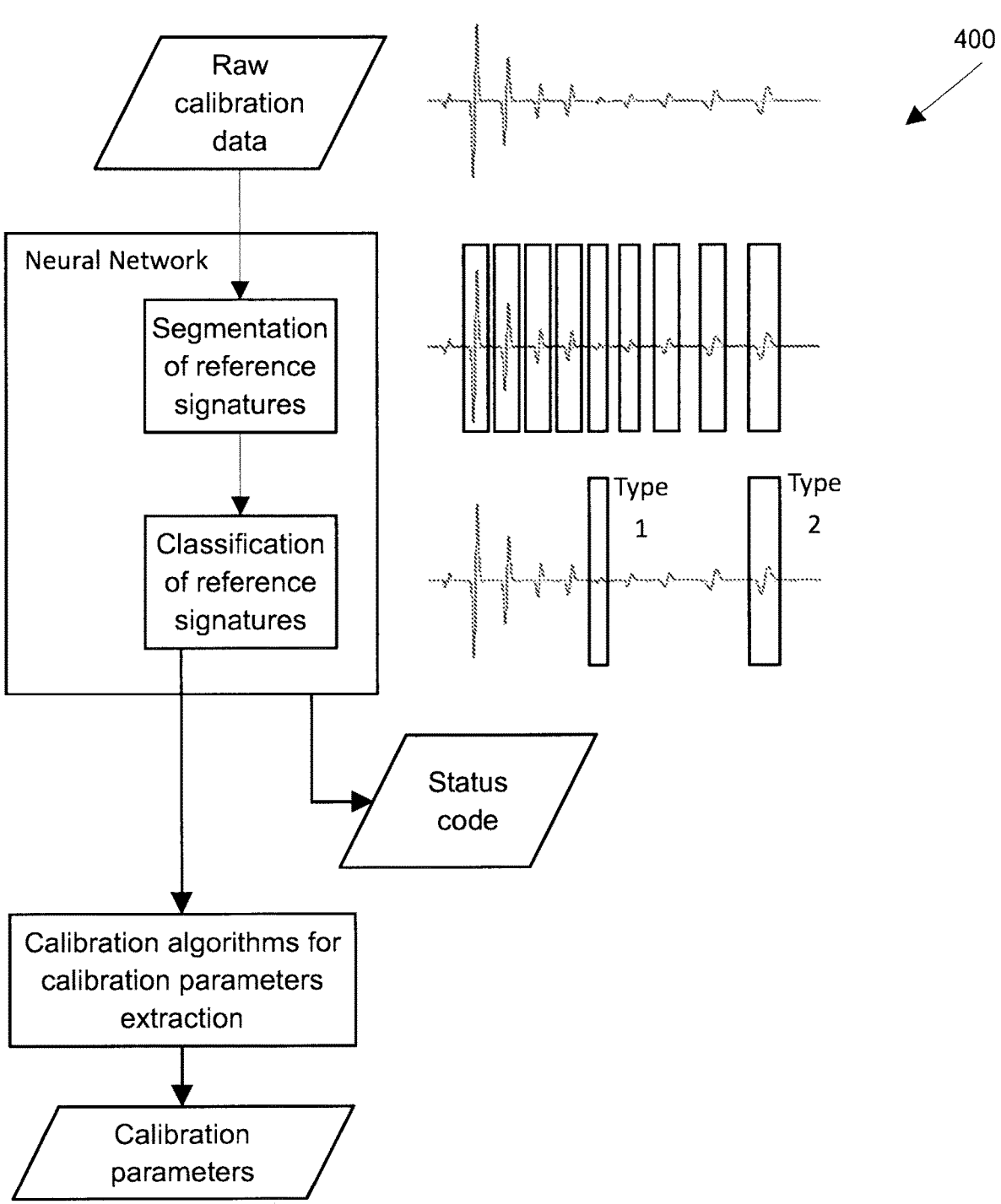
FIG. 5 is a flowchart illustrating a subprocess for assisted calibration of inspection equipment, according to an embodiment.

With reference to FIG. 5, the calibration subprocess 400 can be substantially automated by applying machine learning. In particular, the recorded calibration data can be analyzed via a calibration machine learning algorithm, such as a deep learning neural network trained on historical calibration data with signatures labelled according to a plurality of possible indication types. The neural network can thus segment signatures in the calibration data and classify the segmented signatures according to one of the plurality of indication types. The classified reference signatures can then be provided to the calibration algorithms to allow those algorithms to extract the required calibration parameters. Although a neural network is described, it is appreciated that other machine learning algorithms can also be used.

In some embodiments, the neural network can be trained to output a status code which can assist in indicating whether the process of identifying reference signatures has succeeded or failed. One or more different methods can be applied to output the status code, such as: applying a rule-based validation of the segmented and classified signatures to identify predetermined error conditions (for example, if the segmented signature does not match a predefined mask, a status error can be generated); estimating the confidence level of the neural network classification/prediction using any suitable technique, such as Bayesian confidence estimation, estimation of confidence via ensemble networks, etc. (for example if the confidence level is below a predetermined threshold, a status error can be generated); analyzing the prediction entropy (ex: by estimating entropy E inherent in the possible outcomes of predictions made by the neural network, interpreted as a random variable, such as $$E = -\sum\nolimits_{c=1}^{N} [P_c * \log(P_c)],$$

where given a neural network with input X implementing a classifier with N classes, the network calculates the probability Pc that the input X belongs to a class c (first class: c=1 to last class: c=N). Pc is also referred to as "the prediction" of the network); and/or analyzing prediction curves using techniques such as those described in Devries, Terrance and Graham W. Taylor. "Leveraging Uncertainty Estimates for Predicting Segmentation Quality." ArXiv abs/1807.00502 (2018) (hereafter "Devries et al."), the entirety of which is incorporated herein by reference.

Depending on the technique employed for the analysis, the calibration subprocess 400 can further include other suitable steps, such as: probe balancing or nulling; array balancing or normalization; and material properties compensation, such as adjusting an offset, scale and rotation in remote field testing to compensate for the difference in material properties between a reference tube and the tube to be inspected.

Referring back to FIG. 4, once the inspection equipment is calibrated, a subsequent subprocess 402 can comprise operating the inspection equipment 300 to capture test data. As can be appreciated, the test data collection process can be carried out in any suitable manner depending on the object being expected. For example, in the present embodiment, the heat exchanger being inspected comprises a plurality of straight tubes with two open ends opposite one another, referred to as a proximal end and a distal end. Following a standard inspection protocol, a probe operator can insert the probe in the tube via the opening in the proximal end and push the probe along the tube without recording data, until the distal end of the tube is reached. When the probe exits the tube on the distal end, the data recording can be started, and the probe can be pulled along the tube at constant speed back towards the proximal end. The data recording can be stopped when the probe exits the tube again at the proximal end. The process can be repeated for each tube in the heat exchanger, such that test data is captured for each tube.

The captured test data can be subject to a validation subprocess 404 in order to ensure the quality thereof. The validation subprocess 404 can, for example, be carried out via the validation module 310 of the inspection equipment 300. In the present embodiment, the validation subprocess 404 comprises a combination of one or more rules applied on the raw test data to identify potential problems or errors in the capture process. As an example, data quality validation (DQV) rules can verify if the inspection instrument returns invalid or saturated raw data. As another example, a DQV rule can fail if the expected landmarks are not found in the data, which could indicate that the tube was not fully inspected. As can be appreciated, this DQV rule can take advantage of the analysis capabilities of the AI-based landmark detection subprocess described below. As a further example, a DQV rule can measure the length of the data array captured in a tube and compare it with a theoretical expected length. In a time-encoded data recording system, this rule could fail if the probe was moved too quickly in the tube.

In some embodiments, the setup and calibration of the inspection system can also be subject to a validation subprocess 405 to confirm the quality of the calibration and ensure that the inspection setup is properly adjusted. The validation subprocess 405 can comprise a plurality of checks, such as: validating that all required inspection frequencies are activated; validating that the inspection frequencies are properly arranged in view of the setup settings, such as tube thickness and materials; validating that the calibration operation does not cause the system to saturate internal gain; validating that all setup parameters are congruent and valid; etc.

Figure 6:
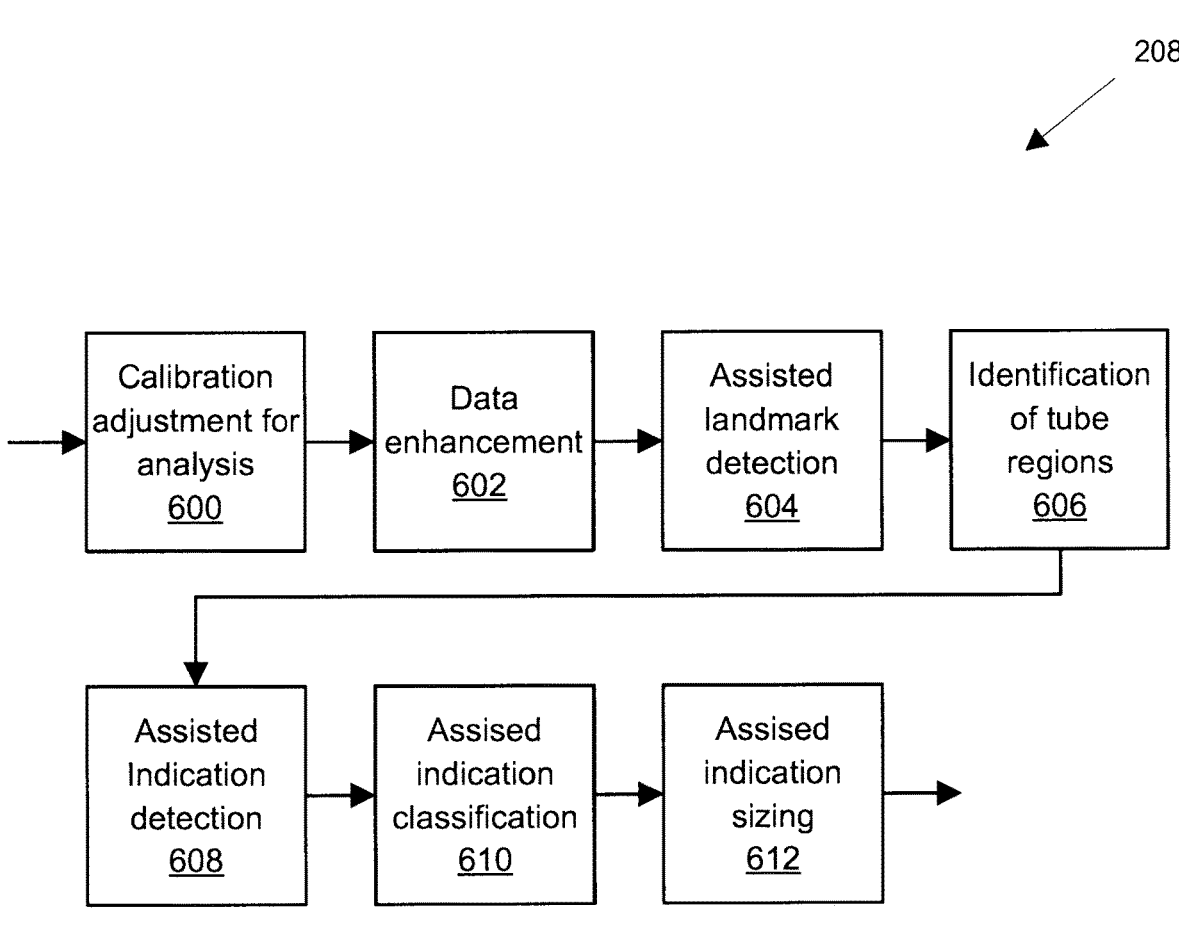
FIG. 6 is a flowchart illustrating subprocesses for analyzing test data in the method of FIG. 2.

With reference to FIG. 6, the step of data analysis 208 is shown in more detail. In the illustrated embodiment, the data analysis step 208 comprises seven subprocesses, namely calibration adjustment for analysis 600, data enhancement 602, assisted landmark detection 604, identification of tube regions 606, assisted indication detection 608, assisted indication classification 610 and assisted indication sizing 612. As can be appreciated, these subprocesses can be carried out by an analyst, for example on an analysis device comprising a processor and memory storing computer executable instruction which, when executed, cause the processor to implement a test data analysis module configured to carry out one or more of the subprocesses. In some embodiments, some of the analysis subprocesses can be performed on the data recording device 304 used to record the test data and as such, the analysis device can comprise the recording device 304. In other embodiments, the analysis subprocesses can be performed on a separate device. For example, the test data can be transferred to and/or accessed from an analysis device that is separate and distinct from the recording device 304 (such as an analyst workstation or other computing device), and the test data can be processed via the analysis device.

In more detail now, the calibration adjustment for analysis 600 subprocess can comprise calibrating and adjusting other software settings prior to analysis to optimize the analysis environment. In some embodiments, simple adjustments can be made, such as adjusting analysis views in the user interface, adjusting color palettes or contrast in 2D views, etc. Depending on the inspection technique, more complex adjustments may be required. Such adjustments may need to be applied to every tube or globally for the whole inspection.

As an example, when the NDT technique being used for inspection corresponds to Remote-Field Testing (RFT) (for example when inspecting ferromagnetic tubes), the test data may need to be subject to a form of normalization to account for small variations of material properties (ex: conductivity and permeability) from one tube to another. Such normalization can correct signal offsets, scaling and rotation of test data acquired from RFT signals as compared to calibration data acquired from reference tubes when the inspection equipment was calibrated. Broadly described, normalization coefficients must be calculated (such as offsets, scaling and rotation), and those coefficients can then be applied to the test data acquired form measured RFT signals.

As can be appreciated, different techniques can be used in order to calculate the normalization coefficients. In some embodiments, the normalization coefficients can be calculated using algorithms that operate on defined normalization features. In particular, the test data acquired from RFT signals can be manually analyzed to identify such normalization features, which can include, for example: a region of nominal tube wall thickness; the signal phase rotation associated with a landmark such as a support plate or a tube sheet; etc. These normalization features can then be fed to a normalization algorithm that calculates the normalization coefficients (such as offsets, scaling and rotation) therefrom.

Figure 7:
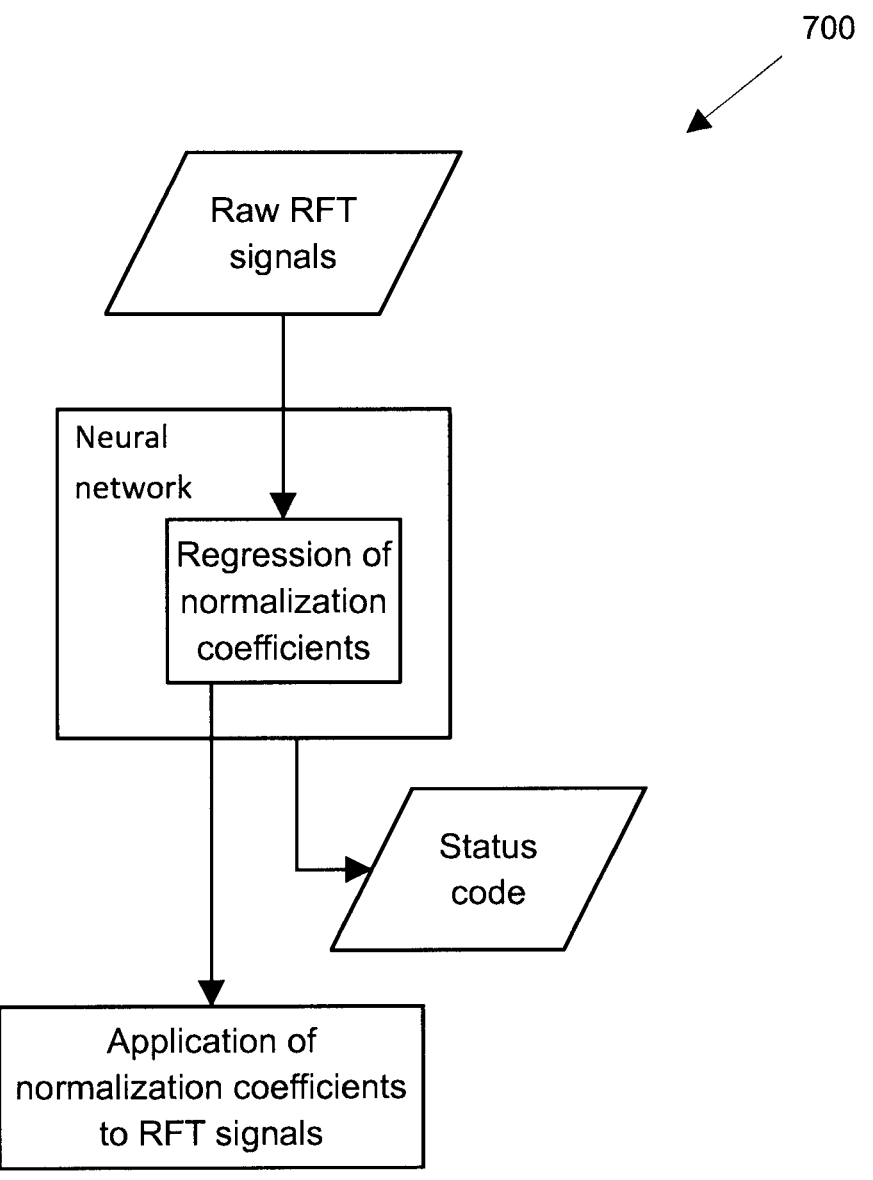
FIG. 7 is a flowchart illustrating a method for automatically predicting normalization coefficients, according to an embodiment.

In some embodiments, the normalization coefficients can be automatically predicted or estimated without explicitly identifying normalization features. By way of example, a process 700 for automatically predicting normalization coefficients is shown in FIG. 7. In the illustrated process, raw test data acquired from RFT signals is provided to a normalization machine learning algorithm, such as a deep learning neural network. The neural network is trained to predict normalization coefficients from the raw data, for example using regression algorithms trained on historical test data and with corresponding normalization coefficients. The predicted normalization coefficients can then be applied to the test data in the same manner described above. Although a neural network is described, it is appreciated that other machine learning algorithms can also be used.

In some embodiments, the neural network can also provide a status code, for example to provide an indication on the success or failure of the prediction of coefficients. One or more different methods can be applied to output the status code. For example, the status code can be implemented via a combination of the following methods that estimate uncertainty of regression and output a status code of failure if the uncertainty is above a predetermined threshold: rule-based coefficients validity check, where too large scaling or offset could either indicate large magnetic property variations or low confidence regression; estimation of the confidence level of the neural network prediction via any suitable technique, such as bayesian confidence estimation, estimation of confidence via ensemble networks, analysis of the prediction entropy, etc. (for example if the confidence level is below a predetermined threshold, a status error can be raised); or other uncertainty methods discussed in Abdar, Moloud, et al. "A review of uncertainty quantification in deep learning: Techniques, applications and challenges." Information Fusion (2021), the entirety of which is incorporated herein by reference. As can be appreciated, remedial action can be taken in response to outputting a failure status code. For example, large magnetic property variations may require data recapturing with adjustment of inspection frequency.

Referring back to FIG. 6, the data enhancement 602 subprocess can comprise processing the raw test data with filters to improve the quality of the raw data and enhance interesting features in the data. Any suitable techniques can be applied, such as: noise filtering; low, median or high pass filtering; dynamic range adjustments, etc.

Once enhanced, the test data can subsequently be analyzed to identify tube landmarks in the test data. This can include, for example, identifying signal signatures corresponding to mechanical support structures in the tubes. The identified landmarks can later be used to estimate an absolute positioning of defects and other indications in the tubes. Also, landmarks are expected tube features and can thus be distinguished from defects.

In the present embodiment, an assisted landmark detection 604 subprocess is provided to substantially automate the detection and identification of landmarks in the test data. As can be appreciated, manual detection and segmentation landmarks in the data is time consuming and error prone. Automatic landmark segmentation can thus reduce the analysis time and allow an analyst to focus on identifying defects.

As can be further appreciated, in many practical situations, the list of detected landmarks may need to be filtered. Such a filtering operation aims to select a proper sequence of landmarks, which may be a subset of the detected landmarks. The filtered landmarks sequence can isolate a portion of the signal corresponding to a region of the tube that should be analyzed for defects and exclude other portions of signal that are not pertinent for the analysis.

As an example, if a probe operator follows a standard inspection protocol as described above (i.e. inserting the probe fully into the tube without recording data, and starting to record data only after the tube is fully inserted and being pulled out of the tube) the recorded data for a straight tube should start with a short section of air (measured at the distal end of the tube), followed by a first landmark called a tube sheet (TS), a series or landmarks called support plates (SP), another tube sheet and air measured at the proximate end of the tube. This, the landmark sequence after detection would be AIR-TS-SP-SP . . . -SP-TS-AIR. However, in many practical situations, the operator may start the recording while still pushing the probe toward the distal end of the tube. In this case, the landmark sequence would show some SP detected (while pushing) before the TS: SP-SP- . . . -SP-TS-AIR-TS-SP-SP . . . -SP-TS-AIR. For clarity, the underlined portion of this landmark sequence corresponds to the section where the probe is being pulled out of the tube, and the portion of recorded data that will need to be analyzed. Landmark filtering thus aims to isolate landmark sequences corresponding to data capture while pulling the probe out of the tube. Other types of recording errors are possible, requiring a similar landmark filtering operation.

Figure 8:
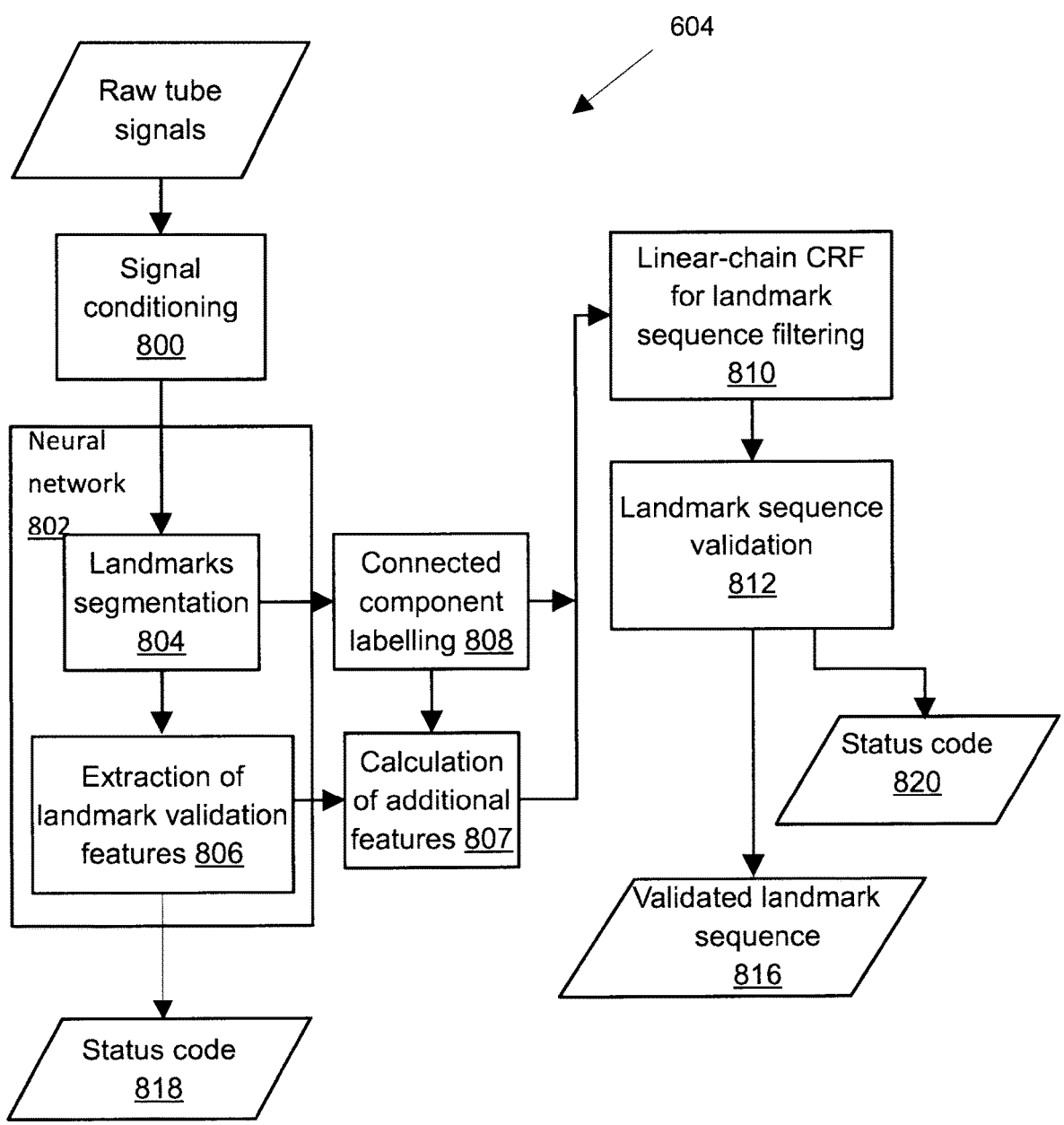
FIG. 8 is a flowchart illustrating a subprocess for assisted landmark detection, according to an embodiment.

An exemplary embodiment of the assisted landmark detection subprocess 604 is shown in FIG. 8. In the illustrated embodiment, the subprocess 604 implements a two-stage method to automatically detect and identify landmarks from signals captured during non-destructive testing of an object. In a first stage, the position and type of the landmarks is detected, and in a second stage sequences of detected landmarks are filtered.

In more detail now, a first step of the method can comprise receiving raw test data. In the present embodiment, the object under inspection corresponds to a metallic tube. Accordingly, the raw test data corresponds to electromagnetic signals captured by a probe moving along the interior of the metallic tube during non-destructive testing thereof.

As can be appreciated, depending on the embodiment, the input test data may need to be calibrated and/or normalized. Accordingly, initial conditioning of the input signals can be carried out in step 800. This can include, for example, scaling and offset operations to normalize the signals statistical mean and variance values.

In a subsequent step, the test data can be processed by a first analysis machine learning algorithm 802 trained to identify a plurality of predetermined landmark types. In the present embodiment, the first analysis machine learning algorithm 802 is a neural network which can, for example, be trained on historical or previously acquired test data labelled according to landmarks identified therein. The neural network 802 can be configured to segment landmarks 804 in the test data and output, for each of a plurality of data points in the test data, a classification of at least one of the plurality of predetermined landmarks types to which the data point corresponds. For example, the output of 804 can comprise curves expressing, for each landmark type, a probability that each data point in the test data is classified as that type of landmarks. As can be appreciated, the neural network structure can be particularly adapted for segmenting landmarks. For example, the neural network can comprise a convolutional neural network architecture in a U-net multi-class classifier configuration. Although a neural network is described, it is appreciated that other machine learning algorithms can be used as first machine learning algorithm.

The classified test data can subsequently be grouped in order to identify start-stop ranges in the test data corresponding to identified landmarks. More specifically, connected regions in the classified test data can be identified, with such connected regions corresponding to sequences of data points likely corresponding to a same landmark. A first data point in each connected region can indicate a start of a range of data points corresponding to a landmark, and a last data point of each connected region can indicate an end of the range of data points corresponding to that landmark. The defined ranges can subsequently be labelled according to the landmark to which they correspond. As can be appreciated, any suitable process can be applied to group and label sequences of data points in the test data classified by the neural network. For example, in an embodiment, the curves output by 804 can be transformed into a sequence of start-stop ranges for all detected landmarks using a connected component labelling (CCL) algorithm 808.

Although in the illustrated embodiment the first neural network 802 is configured to identify landmarks via semantic segmentation 804, it is appreciated that other configurations are possible. In some embodiments, the first neural network 802 can comprise an object detection machine learning algorithm trained to build an object detection model such that the neural network 802 is configured to directly output an array of detected landmarks, i.e. comprising an array of start positions and end positions, corresponding to the start and end of each landmark. For example, the neural network 802 can be a convolutional neural network trained on historical or previously acquired test data having groups of data points labelled according to landmarks identified therein.

In some embodiments, the neural network 802 can be configured to also extract additional features for each landmark 806, which can be used to further qualify and validate the landmarks. As an example, one possible additional feature can comprise a level of confidence associated to the prediction of each landmark by the neural network 802. In some embodiments, additional features can be calculated outside the neural network using conventional algorithms 807. Such algorithms include statistical values such as variance and mean value of the signal associated to a landmark.

In some embodiments, the neural network 802 can be configured to output a status code 818 to provide an indication of whether the landmark segmentation 804 and/or extraction of landmark validation features 806 is successful. One or more different methods can be applied to output the status code, such as: applying a rule-based validation of the segmented and classified signatures to identify predetermined error conditions (for example, if the segmented signature does not match a predefined mask, a status error can be generated); estimating the confidence level of the neural network prediction using any suitable technique, such as Bayesian confidence estimation, estimation of confidence via ensemble networks, etc. (for example if the confidence level is below a predetermined threshold, a status error can be generated); analyzing the prediction entropy; and/or analyzing prediction curves using techniques such as those described in Devries et al.

In a subsequent step, a sequence of landmarks can be extracted from the grouped test data. More specifically, the grouped test data can be modelled as a chain of identified landmarks, and pattern recognition techniques can be applied in order to identify patterns within the chain corresponding to an expected sequence of landmarks (ex: a sequence of AIR-TS-SP-SP . . . -SP-TS-AIR which corresponds to the expected pattern when the probe is being pulled out of the tube). Landmarks identified in the test data that match the pattern can be retained, while landmarks that do not match the pattern can be discarded. In this fashion, an isolated landmark sequence is extracted, corresponding to data captured while pulling the probe out of the tube.

As can be appreciated, several types of pattern recognition algorithms can be specially adapted for identifying patterns in sequential data. For example, in an embodiment, a linear-chain conditional random field (CRF) modelling method can be used. More specifically, the start-stop ranges and the additional features calculated for each landmark can be concatenated and provided as an input to the linear-chain CRF method, and the CRF can be configured to model the landmark sequences using a directed graph. Once provided with the detected landmark sequence, the CRF can find a subset of landmarks that best fit a target graph (ex: a graph representing a sequence pattern MR-TS-SP-SP . . . -SP-TS-MR) while considering both the landmark position and the sequence. The subset of landmarks can be retained while the other landmarks and their corresponding test data can be rejected. For clarity, the subset of landmarks typically contains consecutive landmarks. This step can allow identifying the group of consecutive landmarks that best identify the inspected tube, leaving out any set of additional landmarks captured before and after the tube. These additional landmarks may stem from bad data capture practices, for example if the recording starts too early or ends too late. This step can also remove isolated landmarks in the middle of the good sequence, because those landmarks are identified as errors.

The pattern recognition can be followed by a validation step 812 to validate the extracted sequence of landmarks. As part of this step, one or more checks can be carried out to confirm the pattern recognition behaves and/or performs as expected. For example, the check can comprise: validating that the pattern recognition has rejected/discarded a small fraction of the detected landmarks (ex: that the number of rejects landmarks is below a predetermined threshold and/or percentage relative to the total number of identified landmarks); validating that the test data rejected/discarded by the pattern recognition corresponds to a small fraction of the input test data (ex: that the number of data points rejects is below a predetermined threshold and/or percentage relative to a total number of data points in the input test data); etc. The validation step 812 can output a corresponding status code 820. For example, if one or more validations fail, an error status code can be output to inform a user/analyst that the automatic analysis should be manually validated.

Figure 9:
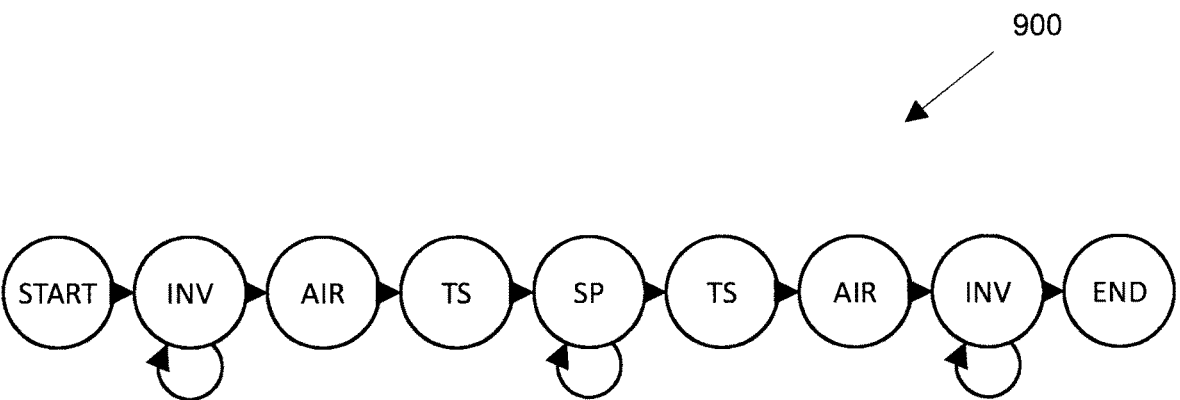
FIG. 9 is a schematic illustrating an exemplary directed graph that can be output by the subprocess for assisted landmark detection of FIG. 8.

The validated landmark sequence 816 can subsequently be output, for example modelled as a directed graph. An exemplary directed graph for an exchanger tube 900 is shown in FIG. 9. As another example, the landmark sequence 816 can be output as an array of validated landmarks with start stop positions of data points in the test data, such as:

```
[
TS, [1 10]
SP, [12 15]
...
SP, [2000 2025]
TS, [...,...]
]
```

Referring to FIG. 6, a subsequent subprocess 606 can comprise identifying or defining analysis regions in the tube using the validated landmark sequence. For example, an "in-tube" region can be defined to identify the whole tube, a "near landmark" region can be identified to define parts of the tube that are in close proximity to landmarks (ex: within a predetermine distance relative to landmarks), a "free span" region can be defined to identify parts of the tube far from landmarks (ex: further away than a predetermined distance relative to landmarks), etc. The defined regions can subsequently be used to fine tune automated detection of indications. For example, as will be explained below, indications can be detected using machine learning employing classification algorithms, and such classification algorithms can use different rules or settings depending on the region in which the indication is to be detected.

Once landmarks have been identified, the test data can be further analyzed in order to detect indications in the object being inspected. In the present embodiment, an assisted indication detection 608 subprocess is provided to substantially automate the detection of indications. In particular, a neural network is provided to automatically detect possible indications via segmentation, although it is appreciated that other indication detection techniques are possible. As can be appreciated, manual detection of indications can be time consuming and error prone. Moreover, rule-based assisted indication detection can be difficult to configure, complex to operate, and not well adapted to the data quality and signals typically encountered in oil and gas inspections. Neural network-assisted automatic indication detection can thus reduce analysis time and provide more accurate results when inspection objects such as an oil and gas heat exchanger. Although a neural network is described, it is appreciated that other machine learning algorithms can also be used.

Figure 10:
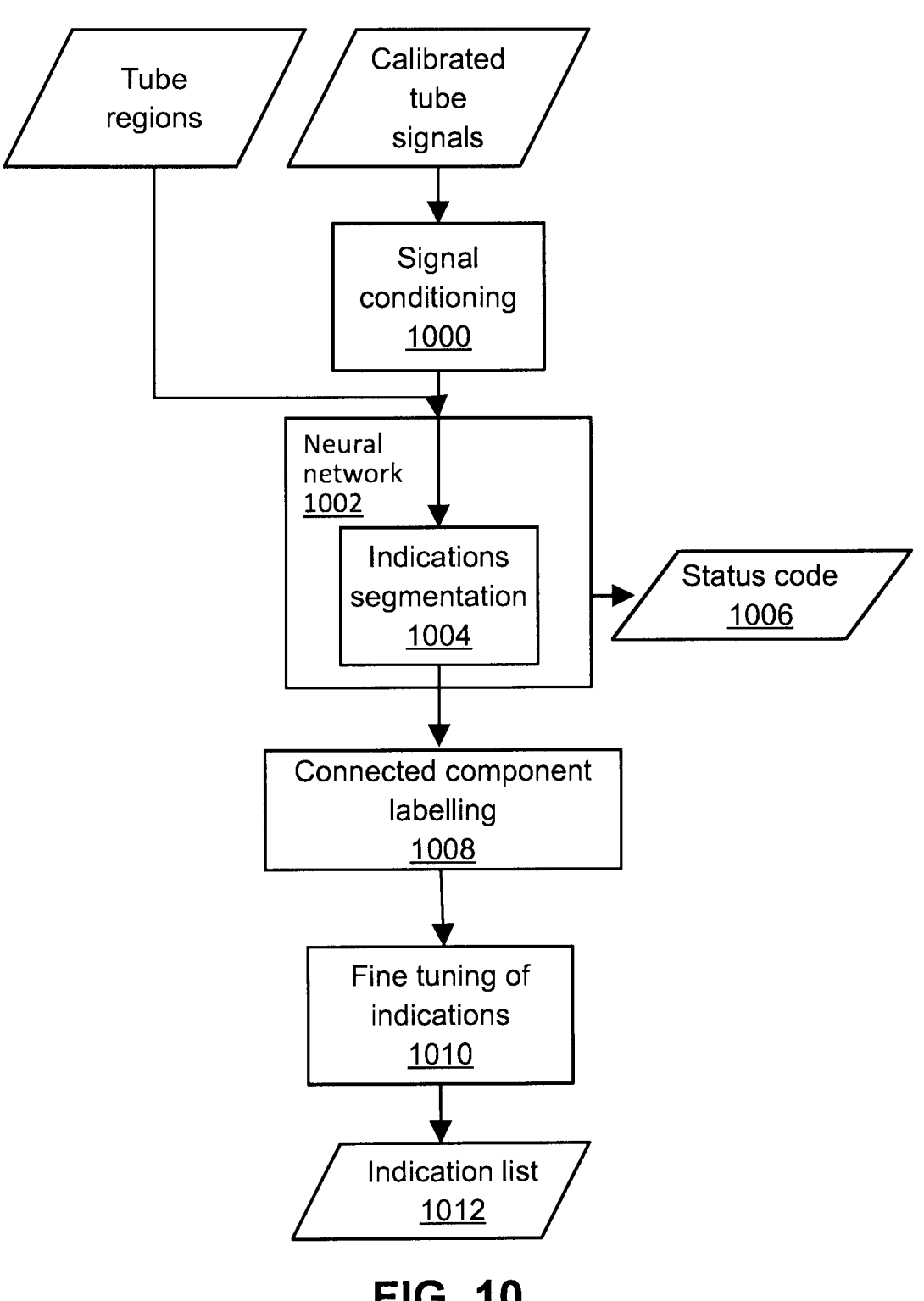
FIG. 10 is a flowchart illustrating a method for automatically detecting indications using a neural network, according to an embodiment.

An exemplary method for automatically detecting indications using a neural network is shown in FIG. 10. In the illustrated embodiment, the previously defined tube regions and the calibrated test data are provided as an input to a second analysis machine learning algorithm 1002. The calibrated tube signals may be conditioned 1000 prior to being provided as an input to the machine learning algorithm 1002 to normalize statistical properties such as mean and variance.

In the present embodiment, the second analysis machine learning algorithm 1002 is a neural network is trained to detect possible indications in the test data, while accounting for the tube regions to which data points in the test data correspond. The neural network 1002 can, for example, be a convolutional neural network trained on historical or previously acquired test data having data points labelled according to whether or not they correspond to an indication, and labelled according to a tube region to which the data point corresponds. The neural network 1002 can be configured to segment indications 1004 in the test data and output, for each of a plurality of data points in the test data, a classification corresponding to whether the data point does or does not correspond to an indication. For example, the output of 1004 can comprise a detection probability curve that provides, for each data point in the test data, a probability that the data point belongs to an indication. In some embodiments, the neural network can also be configured to output a status code 1006 indicating whether or not the segmentation was successful.

The segmented test data can subsequently be grouped in order to identify start-stop ranges in the test data corresponding to detected indications. More specifically, connected regions in the segmented test data can be identified, with such connected regions corresponding to sequences of data points likely corresponding to a same indication. A first data point in each connected region can indicate a start of a range of data points corresponding to an indication, and a last data point of each connected region can indicate an end of the range of data points corresponding to that indication. As can be appreciated, any suitable process can be applied to group sequences of data points in the test data segmented by the neural network. For example, in an embodiment, the curves output by 1004 can be transformed into a sequence of start-stop ranges for all detected indications using a CCL algorithm 1008. In some embodiments, the start-stop ranges can be fine-tuned and validated using measurements on the test data 1010. The result is a list of indications 1012 which includes detected indications and their corresponding data points.

Although in the illustrated embodiment the second neural network 1002 is configured to detect indications via semantic segmentation 1004, it is appreciated that other configurations are possible. In some embodiments, the second neural network 1002 can comprise an object detection machine learning algorithm trained to build an object detection model such that the neural network 1002 is configured to directly output an array of detected indications, i.e. comprising an array of start positions and end positions, corresponding to the start and end of each indication. For example, the neural network 1002 can be a convolutional neural network trained on historical or previously acquired test data having groups of data points labelled according to an indication to which they correspond. This approach can have the advantage of enable the prediction of superposed indications. An example of superposed indications can be a large corrosion (one large indication) with a small pit inside (another short indication that should be marked as superposed to the corrosion).

Figures 13A, 13B, 13C, 13D, 13E:
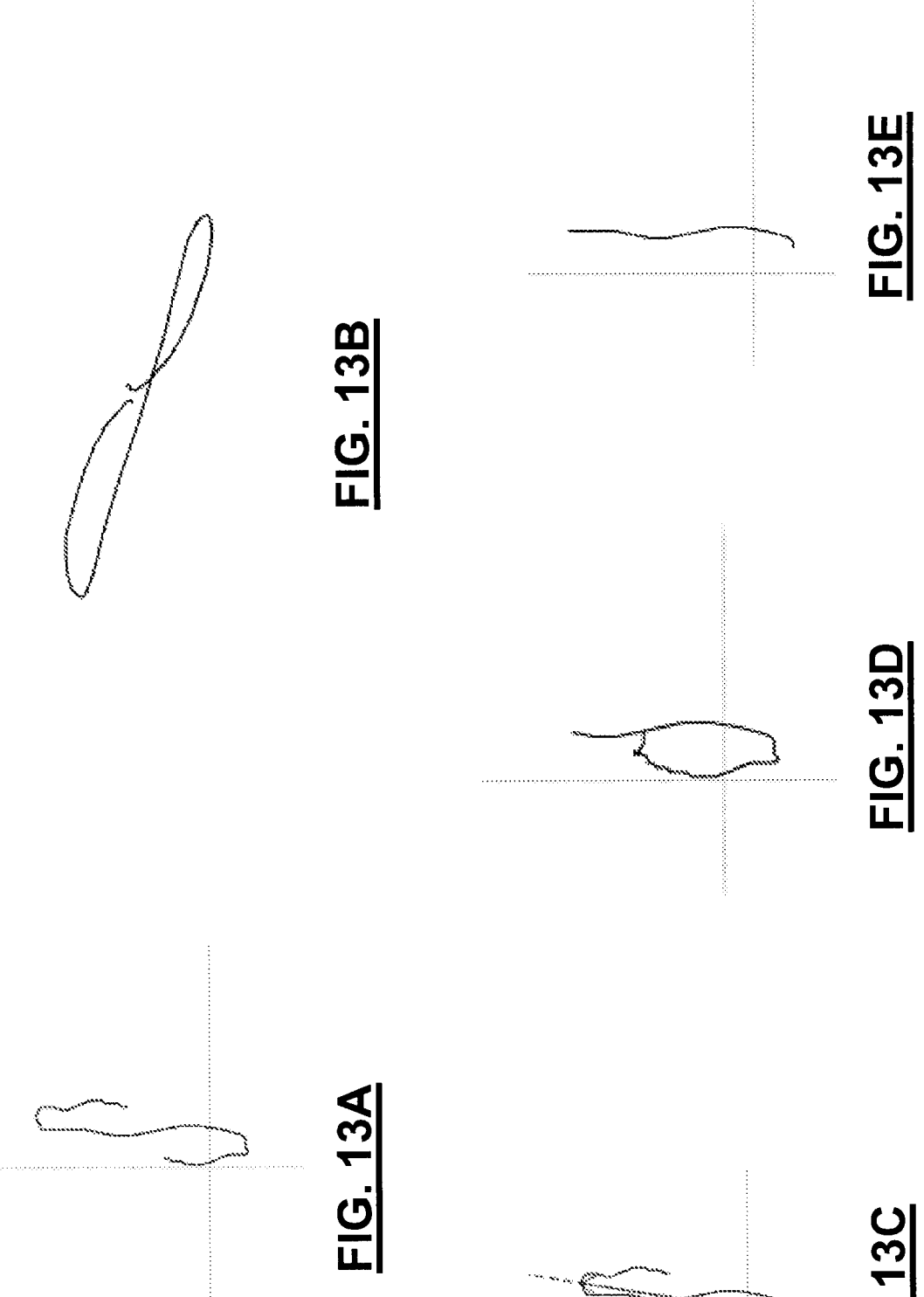
FIGS. 13A-13E are examples of extracted ECT signals represented on a complex plane.

One possible embodiment of fine-tuning applicable to ECT signals can be based on the analysis of ECT differential channels extracted at positions corresponding to the segmented indication. The extracted signals are complex (meaning, characterized by an amplitude and phase at each point). When pictured on a complex plane, the extracted signals should approximately form a FIG. 8. Two examples are shown in FIGS. 13A and 13B.

More specifically, it must be possible to identify two "folds" in the signal. In the example shown in FIG. 13C, the folds are identified by the head and tail of the vector. An appropriate start-stop range allows to identify the folds. A misplaced range or a range too small would not allow to identify the folds. Examples of bad ranges can include misplaced ranges, as shown in the example of FIG. 13D, and ranges that are too small, as shown in the Example of FIG. 13E. Misplaced or small start-stop ranges can be fine-tuned (enlarged or replaced) until the folds are properly detected in the signal. It is appreciated, however, that other embodiments of fine-tuning start-stop ranges are also possible.

Returning to FIG. 6, once indications have been detected in subprocess 608, they can be subsequently labelled or even discarded following different criteria. In the present embodiment, an assisted indication classification 610 subprocess is provided to substantially automate the labelling and/or discarding of detected indications. As can be appreciated, different methods can be applied in order to carry out the labelling and/or discarding of indications. In the present embodiment, a rule-based method is applied in order to label each indication as one of a plurality of predefined indication types or as an indication to be discard, based on a plurality of configurable rules. More specifically, a decision tree is used to label indications based on rules relating to measurements in the test data associated with an indication. As can be appreciated, the decision tree can be user-defined in that the user/analyst can configure the different rules and/or the structure of the decision tree based on requirements of the inspection being carried out.

Figure 11:
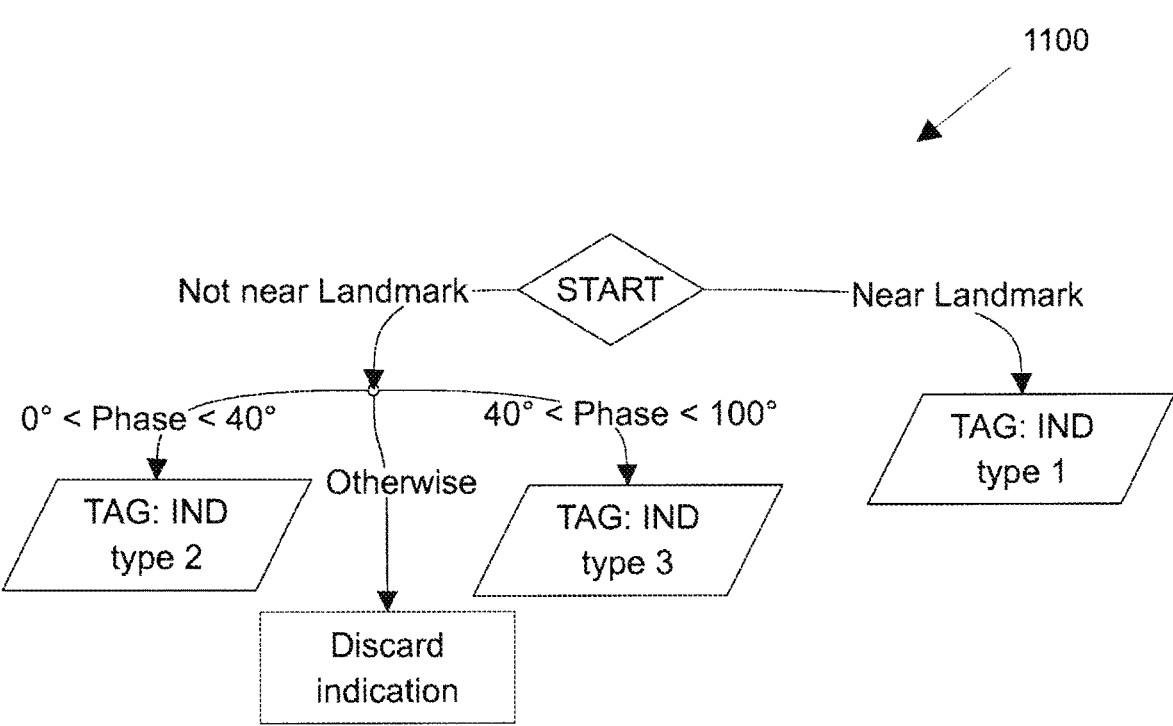
FIG. 11 is a schematic illustrating an exemplary decision tree for labelling indications detected according to the method of FIG. 10.

An exemplary user-configured decision tree 1100 for labelling an indication is shown in FIG. 11. The decision tree is configured to label the indication according to one of a plurality of predefined indications including a type 1 indication, a type 2 indication, a type 3 indication, or an indication to be discarded. In a first node of the decision tree, a position of the indication is evaluated. In particular, it is determined whether or not the indication is near a landmark. The indication can be considered as being near a landmark, for example, if it is within a specified distance (distance in space, or distance in time between timecoded measurements) relative to a landmark. If the indication is near a landmark, it can be labelled or tagged as a type 1 indication. If the indication is not near a landmark, the indication can be evaluated at a second node in the decision tree.

In the second node of the decision tree, a phase of the signals recorded in test data corresponding to the indication are evaluated. In particular, it is determined whether the phase is within a first defined range or a second defined range. If the phase is within a first define range of 0° to 40°, the indication can be labelled or tagged as a type 2 indication. If the phase is within a second defined range of 40° to 100°, the indication can be labelled or tagged as a type 3 indication. Otherwise, the indication can be discarded.

As can be appreciated, the decision tree can be configured by a user/analyst as needed depending on the inspection being carried out and the types of indications to be identified. For example, a user can define different thresholds/ranges when evaluating the position and phase of indications. A user can also define rules to evaluate different characteristics of the test data, such as amplitude and/or define additional rules or conditions to allow labelling additional types of indications.

Returning to FIG. 6, once the indication has been classified via tagging/labelling, it is possible to select an appropriate sizing curve in subprocess 612. The sizing curve can be created by the user/analyst and calibrated on appropriate reference tubes. Subprocess 612 allows a user to assign one or more sizing curves to different types (or classes) of indications. Then, all indications classified according to that type can be automatically sized with these sizing curves.

Turning back now to FIG. 2, once step 208 of analyzing the testing data is complete, the analysis can be subject to a step of review and analysis 210. As can be appreciated, the subprocesses of step 210 can substantially correspond to those of step 208, but can be conducted by a different analyst. For example, step 208 can be conducted by a first analyst via a first analysis device (such as a first analysis workstation), and step 210 can be conducted by a second analyst via a second analysis device (such as a second analysis workstation). The second analyst device can be a different device than the first analyst device. In this manner, the analysis conducted by the first analyst can be validated and/or confirmed by the second analyst. The analysis step 208 can be performed again and/or parameters thereof can be adjusted if there is a difference in the analysis between the first and second analysts.

Finally, once the analysis has been reviewed, an inspection report 212 can be generated and output. As can be appreciated, the inspection report can list the indications located and identified in the testing data. The positions of the indications can be specified relative to locations of the landmarks identified in the testing data.

Although particular advantages and applications of the invention have been explicitly described herein, other advantages and applications may become apparent to a person skilled in the art when reading the present disclosure. The invention is not limited to the embodiments and applications described, and one skilled in the art will understand that numerous modifications can be made without departing from the scope of the invention.

The invention claimed is:

1. A method for identifying indications in an object via non-destructive testing using inspection equipment comprising a probe, the method comprising:
   recording test data from the probe while the probe is operated to scan the object, the test data comprising a plurality of data points, each data point corresponding to a signal measurement acquired by the probe;
   processing the test data using a first analysis machine learning algorithm trained to identify landmarks in the test data and output grouped test data identifying ranges in the test data corresponding to the identified landmarks;
   modelling the grouped test data as a chain of identified landmarks, and identifying patterns within the chain of identified landmarks corresponding to an expected sequence of landmarks;
   extracting an isolated landmark sequence comprising landmarks that match the patterns;
   processing the isolated landmark sequence to identify regions in the object based on the landmarks;
   processing the test data and the identified regions using a second analysis machine learning algorithm trained to detect indications in the test data and output a list of detected indications;
   processing the list of detected indications to automatically classify each of the indications according to one of a plurality of predefined indication types; and
   outputting each of the classified indications in a report specifying positions of each of the classified indications in the object.

2. The method according to claim 1, comprising, prior to recording the test data:
   recording calibration data from the probe while the probe is operated to scan a reference object;
   processing the calibration data using a calibration machine learning algorithm trained to detect and identify reference signatures in the calibration data;
   providing the identified reference signatures to a calibration algorithm to extract calibration parameters; and
   calibrating the inspection equipment by applying the calibration parameters.

3. The method according to claim 2, wherein the calibration machine learning algorithm is trained on historical calibration data comprising reference signatures labelled according to a plurality of possible indication types, and processing the calibration data comprises classifying reference signatures in the calibration data according to one of the plurality of possible indication types.

4. The method according to claim 3, wherein the calibration machine learning algorithm is configured to calculate a confidence score corresponding to an estimated confidence level of reference signature classifications.

5. The method according to claim 4, comprising outputting an error code when the confidence score is below a predetermined threshold.

6. The method according to claim 1, comprising extracting normalization coefficients from the test data, and normalizing the test data by applying the extracted normalization coefficients prior to processing the test data using the first analysis machine learning algorithm.

7. The method according to claim 6, wherein extracting normalization coefficients comprises processing the test data using a normalization machine learning algorithm trained to predict normalization coefficients, the normalization machine learning algorithm being trained using a regression algorithm on historical test data comprising corresponding normalization coefficients.

8. The method according to claim 7, wherein the normalization machine learning algorithm is configured to calculate a confidence score corresponding to an estimated confidence level of normalization coefficient predictions.

9. The method according to claim 1, wherein the second analysis machine learning algorithm comprises an object detection machine learning algorithm trained to recognize indications in the test data and directly output the list of detected indications including, for each indication, a start position and a stop position of data points in the test data that correspond to the indication.

10. The method according to claim 1, wherein the second analysis machine learning algorithm is trained to segment indications in regions of the object identified using the identified landmarks identified by the first analysis machine learning algorithm.

11. The method according to claim 1, wherein the first analysis machine learning algorithm is configured to output classified data points in which each of the plurality of data points is classified according to at least one of a plurality of predetermined landmark types, the method further comprising:

processing the classified data points to generate a sequence of identified landmarks; and identifying regions in the object based on the sequence of identified landmarks.

12. The method according to claim 11, wherein processing the classified data points comprises:

detecting connected regions in the test data corresponding to sequences of the plurality of data points likely corresponding to a same type of the plurality of predetermined landmark types;

generating the sequence of identified landmarks by concatenating each of the connected regions;

comparing the sequence of identified landmarks to a model defining the expected sequence of landmarks in the object, and identifying a subset of identified landmarks in the sequence of identified landmarks that fits best with the model; and outputting the landmark sequence corresponding to the subset of identified landmarks.

13. The method according to claim 11, comprising automatically validating the sequence of identified landmarks using one or more predetermined criteria, and requesting manual validation of the sequence of identified landmarks if the automatic validation fails.

14. The method according to claim 1, wherein the first analysis machine learning algorithm configured to calculate a confidence score corresponding to an estimated confidence level of the identified landmarks.

15. The method according to claim 1, comprising:

processing the test data and the identified regions of the object using the second analysis machine learning algorithm, the second analysis machine learning algorithm being configured to output segmented data points in which each of the plurality of data points is classified as corresponding to an indication or not corresponding to an indication; and processing the segmented data points to generate a list of detected indications.

16. The method according to claim 15, wherein processing the segmented data points comprises identifying connected regions in the segmented data corresponding to sequences of data points likely corresponding to a same indication.

17. The method according to claim 15, wherein the second analysis machine learning algorithm is configured to calculate a confidence score corresponding to an estimated confidence level of detected indications.

18. The method according to claim 1, wherein automatically classifying each of the indications comprises applying a predefined decision tree to either discard the indication or classify the indication according to one of a plurality of predefined indication types.

19. A system for identifying indications in an object via non-destructive testing, the system comprising:

a probe;

a recording device in operative communication with the probe, the recording device comprising a storage module configured to record and store test data from the probe while the probe is operated to scan the object, the test data comprising a plurality of data points, each data point corresponding to a signal measurement acquired by the probe; and an analysis device configured to access the test data stored by the recording device, the analysis device comprising a test data analysis module configured to:

process the test data using a first analysis machine learning algorithm trained to identify landmarks in the test data and output grouped test data identifying ranges in the test data corresponding to the identified landmarks;

model the grouped test data as a chain of identified landmarks, and identify patterns within the chain of identified landmarks corresponding to an expected sequence of landmarks;

extract an isolated landmark sequence comprising landmarks that match the patterns;

process the isolated landmark sequence to identify regions in the object based on the landmarks;

process the test data and the identified regions using a second analysis machine learning algorithm trained to detect indications in the test data and output a list of detected indications;

process the list of detected indications to automatically classify each of the indications according to one of a plurality of predefined indication types; and output each of the classified indications in a report specifying positions of each of the classified indications in the object.

20. A non-transitory computer-readable medium having instructions stored thereon to identify indications in an object via non-destructive testing using inspection equipment comprising a probe, the instructions, when executed by one or more processors, cause the one or more processors to:

record test data from the probe while the probe is operated to scan the object, the test data comprising a plurality of data points, each data point corresponding to a signal measurement acquired by the probe;

process the test data using a first analysis machine learning algorithm trained to identify landmarks in the test data and output grouped test data identifying ranges in the test data corresponding to the identified landmarks;

model the grouped test data as a chain of identified landmarks, and identifying patterns within the chain of identified landmarks corresponding to an expected sequence of landmarks;

extract an isolated landmark sequence comprising landmarks that match the patterns;

process the isolated landmark sequence to identify regions in the object based on the landmarks;

process the test data and the identified regions using a second analysis machine learning algorithm trained to detect indications in the test data and output a list of detected indications;

process the list of detected indications to automatically classify each of the indications according to one of a plurality of predefined indication types; and output each of the classified indications in a report specifying positions of each of the classified indications in the object.

* * * * *